(12) United States Patent  
Stein et al.

(10) Patent No.: US 6,354,613 B1
(45) Date of Patent: Mar. 12, 2002

(54) RACING SULKY

(76) Inventors: Craig Stein, 8795 Crow Dr., Macedonia, OH (US) 44067; Aaron L. Mulrooney, 3064 W. Edgerton Rd., Silver Lake, OH (US) 44224

( * ) Notice: Subject to any disclaimer, the term of this patent is extended or adjusted under 35 U.S.C. 154(b) by 0 days.

(21) Appl. No.: 09/574,286

(22) Filed: May 19, 2000

Related U.S. Application Data

(63) Continuation-in-part of application No. 09/430,224, filed on Oct. 29, 1999, now Pat. No. 6,095,536.

(51) Int. Cl.[7] ................................................. B62C 1/08
(52) U.S. Cl. ............................ 280/63; 280/64; 280/65
(58) Field of Search .............................. 280/63, 64, 65

(56) References Cited

U.S. PATENT DOCUMENTS

| | | | | |
|---|---|---|---|---|
| 521,460 A | * | 6/1894 | Elliott | 280/63 |
| 615,447 A | * | 12/1898 | Greutman | 280/63 |
| 643,728 A | * | 2/1900 | Payne | 280/63 |
| 762,038 A | * | 6/1904 | Frazier | 280/63 |
| 970,828 A | * | 9/1910 | Hubbard | 280/63 |
| 3,163,438 A | * | 12/1964 | Bliss, Jr. | 280/63 |
| 3,256,125 A | * | 6/1966 | Tyler | 280/63 |
| 3,388,921 A | * | 6/1968 | Pickard | 280/63 |
| 4,033,598 A | * | 7/1977 | King | 280/63 |
| 4,071,257 A | * | 1/1978 | Discount | 280/63 |
| 4,078,829 A | * | 3/1978 | Davis | 280/657 |
| 4,095,815 A | * | 6/1978 | Mitchell | 280/63 |
| 4,135,730 A | * | 1/1979 | Yunick | 280/65 |
| 4,326,367 A | * | 4/1982 | Cashman | 54/2 |
| 4,667,973 A | * | 5/1987 | Bowers | 280/63 |
| 4,817,975 A | * | 4/1989 | Saraydar | 280/63 |
| 4,863,180 A | * | 9/1989 | Guarino et al. | 280/63 |
| 5,183,279 A | * | 2/1993 | Acerno et al. | 280/63 |
| 5,607,170 A | * | 3/1997 | Capjon et al. | 280/63 |
| 5,857,686 A | * | 1/1999 | Millington | 280/63 |
| 6,095,536 A | * | 10/1999 | Stein et al. | 280/63 |

* cited by examiner

Primary Examiner—Christopher P. Ellis
Assistant Examiner—Rashmi Sharma
(74) Attorney, Agent, or Firm—Renner, Kenner, Greive, Bobak, Taylor & Weber

(57) ABSTRACT

A racing sulky, including an arch including a transverse member and a pair of struts, a pair of rails adjacent the arch, the struts extending downwardly and forwardly from the transverse member, wherein the transverse member defining a main plane, supported on the plane being oriented substantially parallel to a ground plane, and a wheel rotatably supported on each of the struts.

11 Claims, 3 Drawing Sheets

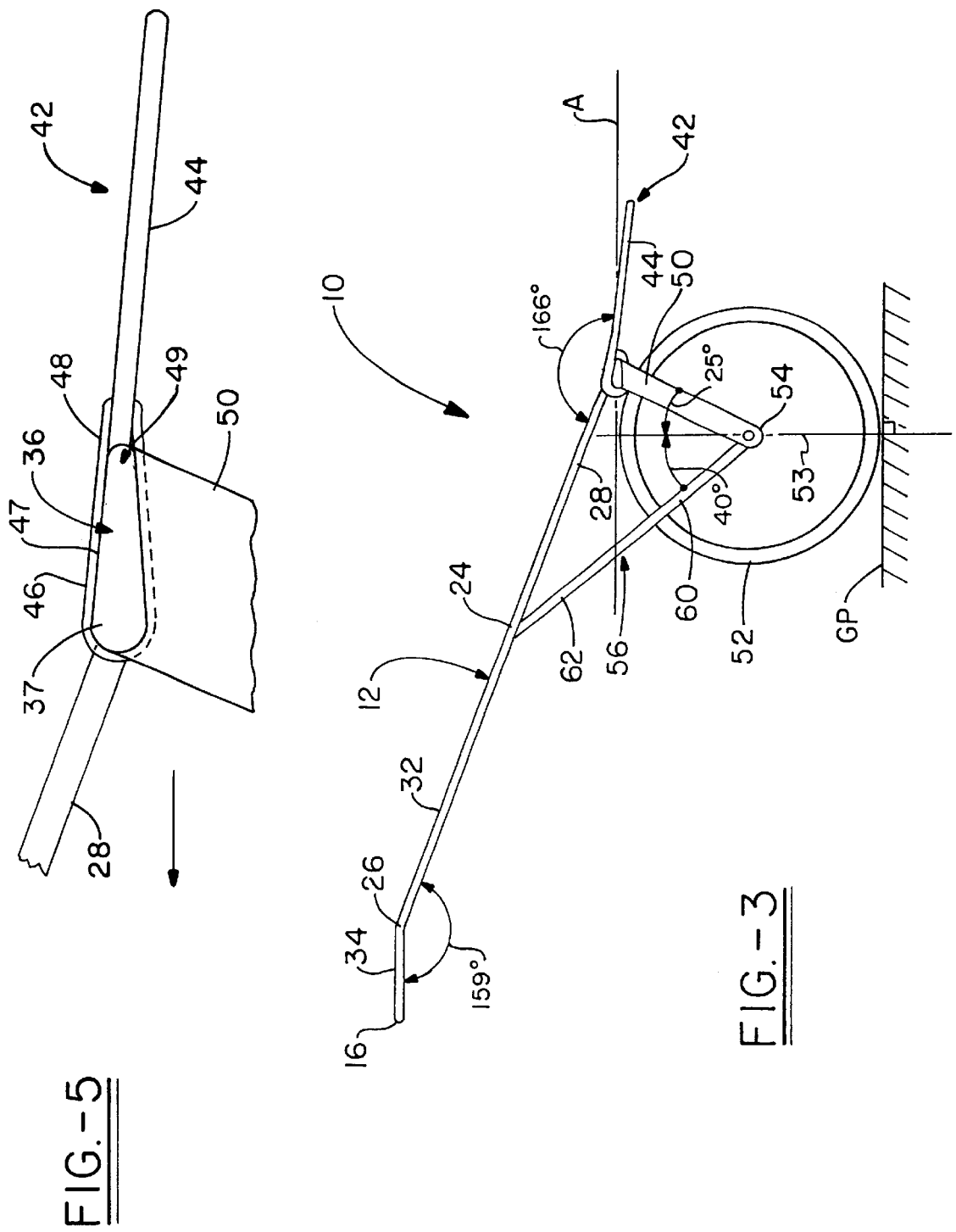

RACING SULKY

CROSS REFERENCE TO RELATED APPLICATION

This is a continuation-in-part of patent application Ser. No. 09/430,224, filed Oct. 29, 1999, now U.S. Pat. No. 6,095,536 entitled "Racing Sulky."

TECHNICAL FIELD

This invention relates generally to a horse drawn sulky. More particularly, this invention relates to a racing sulky to be drawn by a trotting or pacing horse in harness racing competition.

BACKGROUND OF THE INVENTION

In harness racing, a trotting or pacing horse closely draws a two-wheeled sulky or "bike" which supports a driver on a seat positioned between two (2) co-axially arranged wheels. The basic components of the sulky typically include two (2) forward extending spaced apart shafts attached at the rear to a wheel and seat support assembly. The horse is positioned between the two (2) shafts, which are attached to a saddle positioned at the horse's front shoulders or withers.

Speed and maneuverability are primary concerns in the design and construction of racing sulkies. Until now, however, little attention has been given to improving the design, construction and aerodynamics of racing sulkies to reduce overall resistance to the horse's forward motion and thereby increase racing speed.

More recent sulky designs comprise a pair of spaced apart generally longitudinally extending shafts extending forwardly from a transverse member on which the sulky's wheels are mounted. The rear portions of the shafts are attached to the transverse member. However, the shafts are spread wide apart over their entire length to accommodate the width of the horse. As a consequence, the shafts are in the air stream created by the horse as it runs, causing some wind resistance. Also, the rear portions of the shafts, upon which stirrups are mounted, are spaced uncomfortably far apart, requiring the driver to spread his legs appreciably in order to put his feet in the stirrups.

The driver's seat extends horizontally and rearwardly from the transverse member. As a consequence, the driver is held upright with his upper body perpendicular to the forward motion of the cart. In this position, the driver's upper body creates significant wind resistance. To reduce resistance, some drivers may lean rearwardly reducing the amount of wind resistance. But, this position is difficult for the driver to physically maintain, particularly while seeking to maintain control over both the horse and sulky.

In addition to the awkward positioning of the driver, known seats are generally attached at a portion of the upper surface of the transverse member by a pair of bars or tubes, which typically have a circular cross-section. Since conventional transverse members are circular or oval in cross-section, this type of attachment may be tangential and, thus, weak. Moreover, the limited joint area focuses the static forces created by the seated driver and the dynamic forces created during a race on a small area of the transverse member. It is thus desirable to increase the joint area to improve joint strength.

Further, the conventional attachment of known seats is above the transverse member and places the seat and, thus, the driver farther from the ground, resulting in a raised center of gravity which adversely affects the bike's stability, tracking, and handling.

During a race, a poorly tracking bike appears to "walk" with the wheels alternately advancing one in front of the other. This "walking" motion is believed to increase resistance to the bike's forward motion.

Separately, underslung sulkies, those having struts that extend forwardly from the transverse member, tilt the transverse member back. In sulkies having non-circular transverse member cross-sections, the tilting exposes a larger portion of the member's surface area to the wind, increasing resistance to the sulky's forward motion.

Therefore, a need exists for a sulky that reduces resistance to the horse's forward motion while there is still a further need for a sulky that holds the driver in a stable seated position that reduces wind resistance created by the driver.

SUMMARY OF THE INVENTION

It is therefore an object of the present invention to provide a racing sulky that reduces resistance to the horse's forward motion.

It is another object of the present invention to provide a seat in a racing sulky that has an increased contact area where it is attached to the arch of the sulky than in the past.

At least one of the foregoing objects of the present invention are achieved by a racing sulky comprising a pair of rails, each having a first end and a second end, an arch having an upper surface adjacent the second ends, having a pair of struts extending downwardly from each end of the transverse member, a wheel rotatably mounted in each of the pair of struts, and a seat attached to the arch across substantially the entire upper surface of the arch.

The present invention further provides a seat in a racing sulky to be drawn by a horse, the sulky comprising a pair of rails adjacent an arch having a pair of wheels rotatably supported thereon, the seat comprising a pair of support members wrapped substantially around the arch and extending rearwardly from the arch, forming a seat receiving portion, a seat supported on the seat receiving portion of the support members.

The present invention further provides a racing sulky to be drawn by a horse, comprising an arch having a pair of wheels rotatably supported thereon, said arch having an airfoil cross-section, and a pair of rails adjacent the arch.

Other objects of the present invention are attained by a racing sulky, comprising an arch including a transverse member having a non-circular cross-section and a pair of struts, a pair of rails adjacent the arch, the struts extending downwardly and forwardly from the transverse member, wherein the transverse member has a major axis, the major axis being oriented substantially parallel to a ground plane, and a wheel rotatably supported on each of the struts.

Still another object of the present invention is attained by a seat support supporting a seat in a racing sulky having an arch having a cross-section rotatably supporting a pair of wheels and a pair of rails adjacent the arch for attaching the arch to a horse, the seat support comprising a support member in supporting relation to the seat and a portion of the support member extending adjacent a majority of the arch in terms of its cross-section, the portion attaching the support member to the arch.

Yet further objects of the present invention are attained by a racing sulky, comprising an arch having a non-circular cross-section, the cross-section having a leading end and a trailing end, a pair of wheels rotatably supported on the arch, a pair of rails adjacent the arch, and a seat supported by at least one support member, the support member having a first end and a second end, the seat being supported on the second end, and the first end being located adjacent behind the transverse member adjacent to the trailing end.

At least one of the objects of the present invention, as well as other advantages thereof over existing prior art forms, which will become apparent from the description to follow, are accomplished by the improvements hereinafter described and claimed.

BRIEF DESCRIPTION OF THE DRAWINGS

FIG. 3 is a side elevational view of the racing sulky oriented as if attached to a horse with the driver shown in phantom;

FIG. 5 is an enlarged side elevational view depicting the relation of the seat support member and the arch.

DETAILED DESCRIPTION OF THE INVENTION

One representative form of a racing sulky embodying the concepts of the present invention is designated generally by numeral 10 on the accompanying drawings. Racing sulky 10 may be constructed of chrome-molybdenum, other metals, polymeric materials, wood, or combinations thereof. Similarly, the materials of the various components making up a racing sulky 10 may vary with respect to one another, depending on the conditions affecting that particular component.

Figure 1:
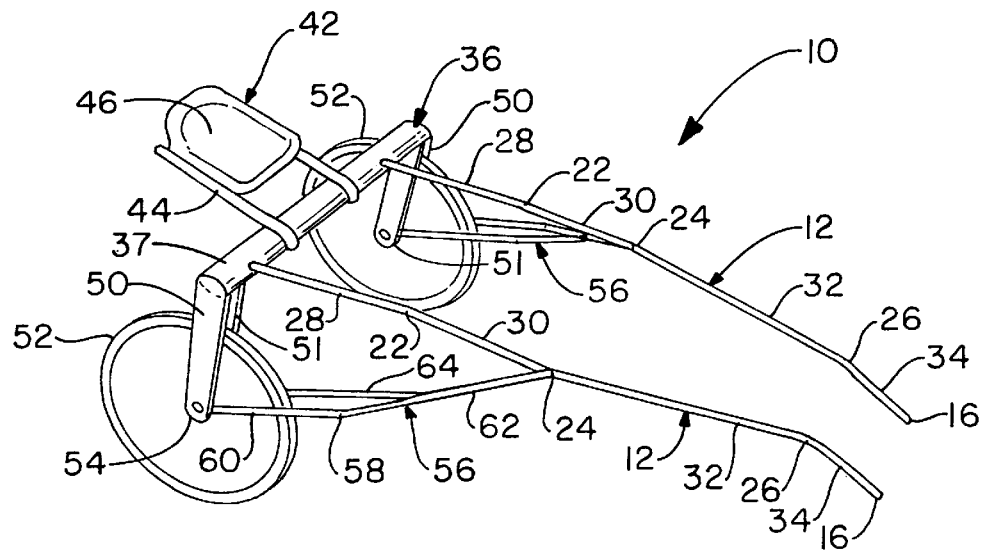
FIG. 1 is a perspective view of the racing sulky according to the present invention.
Figure 2:
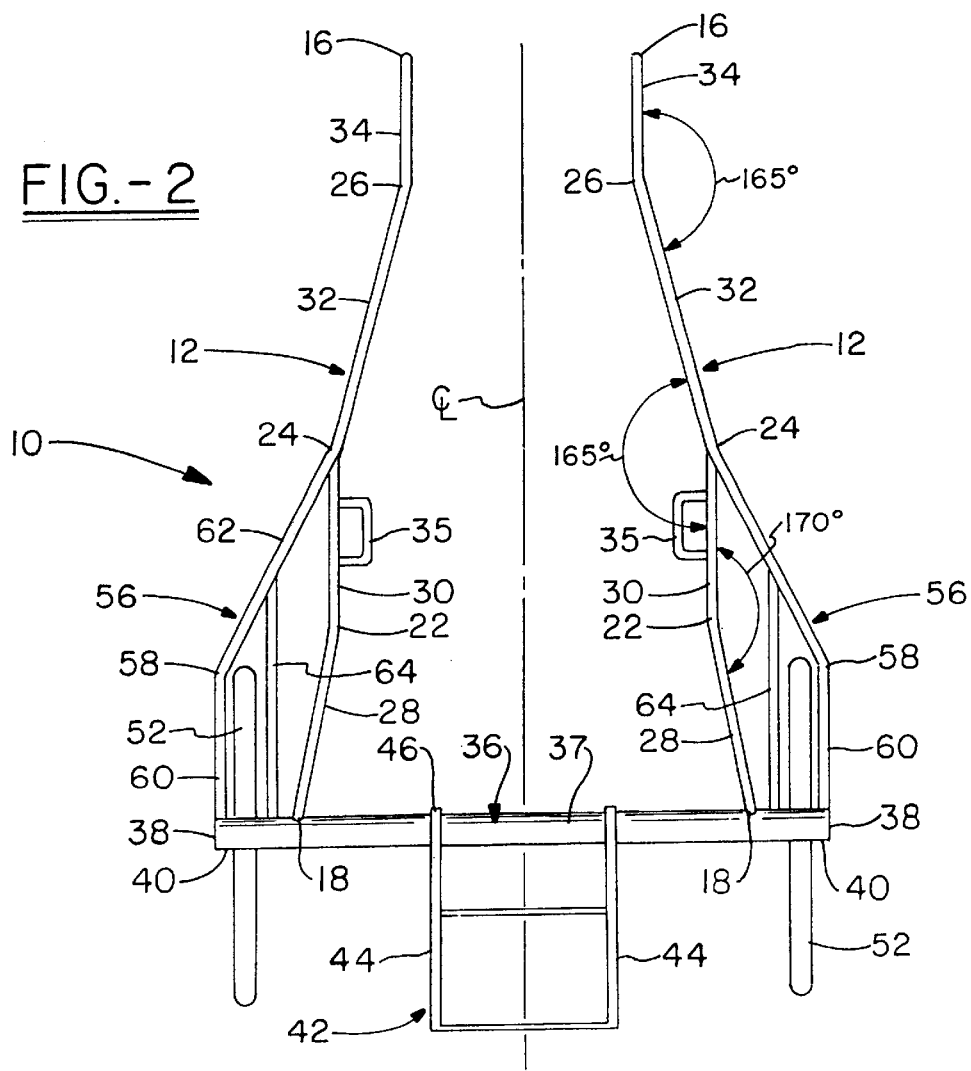
FIG. 2 is a top plan view of the racing sulky.

With reference to FIGS. 1 and 2, racing sulky 10 is symmetrical with respect to a longitudinally extending center line CL. Racing sulky 10 includes a pair of generally longitudinally extending and spaced apart rails 12, which are symmetrical about center line CL. Rails 12 may be mirror images of each other. Each rail has two opposite ends, namely, a first end 16 and second end 18. The second end 18 is generally at or near the rear portion of the racing sulky 10.

The rails may be of any form known in the art, including straight, bowed, or angular. The following description discusses the rails of U.S. Ser. No. 09/430,224 by way of example only. As shown in FIG. 2, each rail 12 may include a plurality of spaced bends. These bends, from the second end 18 to the first end 16, are: an outward bend 22, an inward bend 24, and an outward bend 26. These bends divide rails 12 into a plurality of segments, namely, a first segment 28 extending from second end 18 to first bend 22, a second segment 30 extending from first bend 22 to second bend 24, a third segment 32 extending from second bend 24 to third bend 26, and a fourth segment 34 extending from third bend 26 to first end 16. As best shown in FIG. 3, first, second, and third segments 28, 30, 32 extend upwardly relative to a plane parallel to the ground or ground plane GP. Fourth segment 34 extends outwardly and downwardly from third segment 32 and is substantially parallel to ground plane GP.

While the rails have been described in terms of segments, rails 12 may be unitary structures in which adjacent segments are integrally joined at the bends by weldments or, alternatively, the rails may each comprise a single tubular member. With respect to the center line CL, first and third segments 28, 32 extend inwardly towards center line CL, and second segment 30 is substantially parallel to center line CL or may extend slightly inwardly. Fourth segment 34 of rails 12 is substantially parallel to center line CL.

It should be understood that the spacing of rails 12 at each segment may be varied to a large extent based on the horse size, rider size, comfort, or bike stability. A representative spacing between the rails at the transverse member 37 is about 44 inches. In similar fashion, the angle of each bend may vary as needed. Representative angles in the horizontal plane for each rail 12 maybe about 155°–175°, and preferably about 170° at first bend 22, about 155°–175°, and preferably about 165° at second bend 24, and about 155°–175°, and preferably about 165° at third bend 26. In the vertical plane, side rail 12 makes an angle of about 140°–170°, and preferably about 159° between third and fourth segments 32 and 34. Representative segment lengths are about 18 inches for first segment 28, about 17.5 inches for second segment 30, about 27 inches for third segment 32, and about 13 inches for fourth segment 34.

Stirrups 35 may be attached to rails 12 and, as shown in FIG. 2, are preferably located on either first segment 28 or second segment 30. More preferably, stirrups 35 are located on second segment 30 of rails 12 and extend inwardly therefrom. Since second segment 30 may be located closer to center line CL, placing stirrups 35 on second segment 30 brings the stirrups closer together, reducing the distance that the driver's legs are spread. A representative spacing between stirrups 35 as they extend inwardly from rails 12 is about 30 inches.

Second ends 18 of rails 12 are adjacent and may be attached to an arch 36. The arch 36 may include a transverse member 37 and struts extending downwardly from transverse member 37 to rotatably support wheels as will be described below. The transverse member 37 may extend beyond second ends 18 and terminate in a transverse member end 38 forming an end portion 40 therebetween. It should be understood that second end 18 may be moved inwardly to the point of changing bend 22 from an inward bend to an outward bend. Accordingly, the length of transverse member 37 would be shortened along with the end portion 40. End portion 40 is sized to provide sufficient room for support struts and wheels mounted thereon, as will be described below. As best shown in FIG. 5, arch 36 may have an aerodynamic profile, such as an airfoil shape to reduce drag.

Figure 4B:
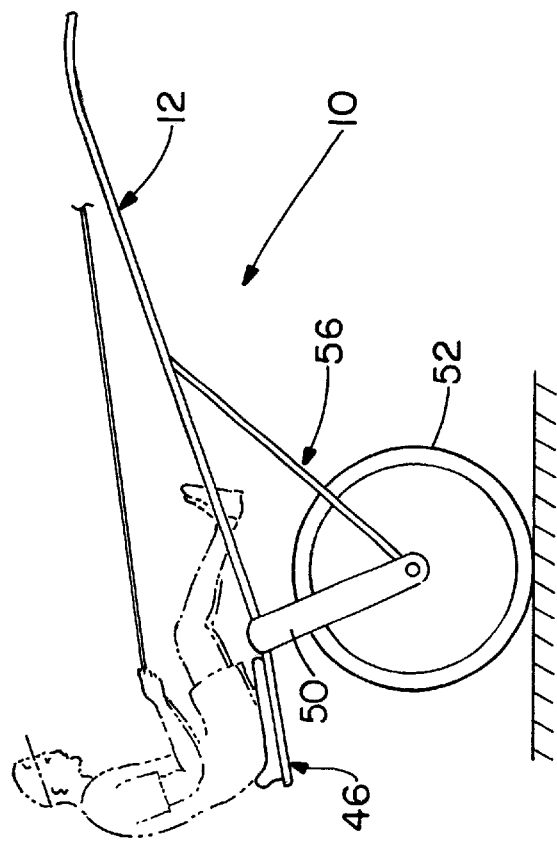
FIG. 4B is a side elevational view of the present invention with the driver shown in phantom lines.
Figure 4A:
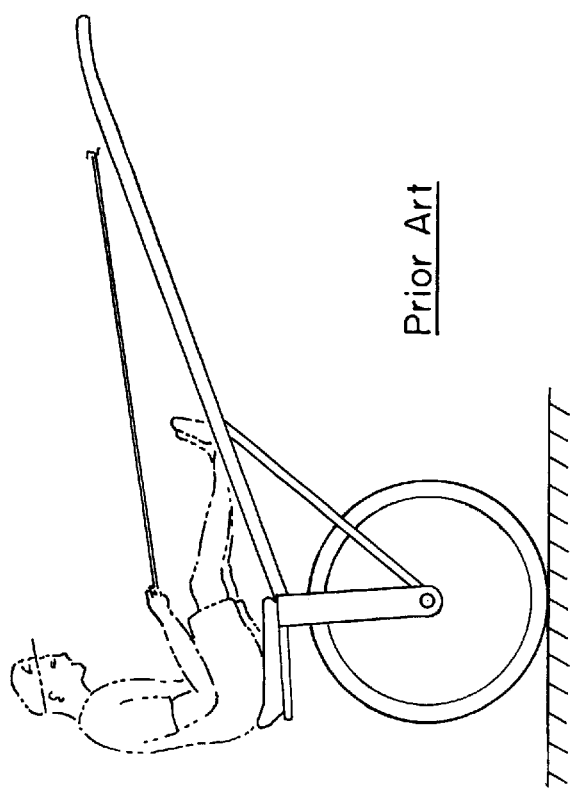
FIG. 4A is a side elevational view of a prior art sulky with the driver shown in phantom lines.

With reference to FIG. 2, a seat 42 may be attached to transverse member 37, between second ends 18 of rails 12. The seat 42 may be attached in any conventional manner, or integrally formed with transverse member 37. As shown, seat 42 includes a pair of seat supports 44 and a seat portion 46 spanning the seat supports 44. As best shown in FIG. 3, when in use, the seat 42 extends rearwardly and downwardly from the transverse member 37 at an angle depending away from the horizontal. In this way, seat 42 is at least partially tucked behind transverse member 37, which is believed to reduce drag and lower the driver's center of gravity. With respect to side rails 12, seat 42 extends rearwardly and upwardly. A representative angle between side rail 12 and seat 42 may be about 150°–175°, and preferably about 166°. As best shown in FIG. 4B, when the driver is seated on seat 42, this angle places the driver in a partially reclined position that reduces the wind resistance created by the driver. While not completely understood, it is believed that the reclined position of the driver presents reduced cross-sectional area perpendicular to the motion of the bike. Moreover, the reclined position is believed to cause the driver's upper body to act similar to an air foil as shown in FIG. 4B, in contradistinction to an effective air shield as shown in FIG. 4A of the prior art.

Further, supports 44 attach to transverse member 37 at a first end. To increase the area of attachment, the first end 46 may extend about a substantial portion of the perimeter of transverse member 37. The support 44 may have a first end that extends over at least one-tenth of the perimeter 47, at least 25%, 50%, 75%, or completely surround the cross-sectional perimeter 47 of arch 36. Alternatively, the area of attachment may be increased by spreading the first end radially outwardly. In either case, the increased area of attachment increases the area to which forces from the seat 42 are transmitted.

In the embodiment shown, first end 46 includes a thin band of material 48 that substantially surrounds the transverse member 37, defining a loop. It will be appreciated that multiple bands 48 may be used, such as a first band on the top of arch 36 and a second band on the bottom of arch 36 to attach support member 44 to arch 36. The supports 44 are thus adjacent and substantially behind the trailing end of 49 of transverse member 37. It is believed that placement of the supports 44 at least initially behind and adjacent the rear edge of arch 36 reduces the drag created by supports 44.

To further place the driver in a more aerodynamic position, struts 50 and 51 may be angled toward the front of the racing sulky 10. With reference to FIG. 3, the wheel struts 50 and 51 extend downwardly from end portion 40 of transverse member 37. An outer strut 50 is located at transverse member end 38 and an inner strut 51 is spaced inwardly along transverse member 37 from the outer strut. Struts 50 and 51 may extend generally vertically from transverse member 37, or they may be angled slightly to alter a driver's position or the weight distribution of the racing sulky 10. By extending struts 50 and 51 downwardly and forwardly from end portion 40, the driver is further reclined. Moreover, this angle moves a majority of the racing sulky's weight behind the center of wheels 52. When the struts are angled forward of the transverse member 37, the transverse member tilts up. For transverse members having non-circular cross-sections, such as ovals, ellipses, air foils, and others, that are horizontally oriented, their major axis is parallel to the ground plane (G.P.), the tilting of the sulky presents a larger portion of their surface area into the air stream. As shown in FIG. 3, the major axis A of transverse member 37 is made parallel to the ground plane when the struts are forwardly angled to reduce wind resistance. Wheel 52 is fastened in a conventional manner to struts 50 and 51 at lower end 54.

Since the wheel 52 is fastened to the lower end 54 of struts 50, which may be angled toward the forward end of racing sulky 10, a majority of the racing sulky's weight is placed behind a wheel center 53 when the struts 50 and 51 are so angled. The angle of the struts 50 and 51 may be about 0°–50°, 15°–45°, or about 25° clockwise from vertical.

To provide additional stability, an outer support member 56 may extend upwardly from lower end 54 to side rail 12 and attach thereto at approximately the second bend 24 of side rail 12. Referring to FIG. 2, outer support member 56 has two segments joined by a inward bend 58. In the vertical plane, both of the segments of outer support member 56 extend upwardly at the same angle, but in the horizontal plane (FIG. 2) the first segment 60 extends forwardly parallel to center line CL and second segment 62 extends forwardly and inwardly from first segment 60.

An inner support member 64 extends from lower end 54 of inner strut 51 and may attach to second segment 62 of outer support member 56. By attaching inner support member 64 to the second segment 62 of outer support member 56 instead of attaching it directly to rail 12, the length of inner support member 64 is reduced. The reduced amount of inner support member material beneficially reduces the sulky's weight. Inner support member 64 may extend upwardly at the same angle as outer support member 56, as shown. Inner support member 64 extends toward the front of racing sulky 10 parallel to outer support member 56.

Both inner and outer support members 64, 56 serve to further stabilize struts 50, 51. The support members 64, 56 prevent distortion of struts 50, 51, which could affect wheel alignment or rotation. For example, any torsion of struts 50, 51 may cause the direction of the wheels 52 to fall out of parallel alignment with the center line CL. The misaligned wheels would hinder the motion of the sulky 10, reducing its top speed and acceleration. Flexion of struts 50,51 may similarly cause misalignment as described above, or may cause one wheel 52 to rest at a different elevation than the other wheel, again, resulting in misdirection and/or reduced performance. Finally, if struts 50, 51 flex inwardly, the struts may squeeze the wheels 52 increasing the frictional forces opposing the rotation of the wheels 52. Stabilizing struts 50, 51 and maintaining good wheel alignment allows the racing sulky 10 to track or follow the horse more readily. Improved tracking may be recognized by the driver as increased responsiveness when turning, reduced resistance to the horse's forward movement or, in general, as improved maneuverability.

Thus, it can be seen that at least one of the objects of the invention have been satisfied by the structure and its method for use presented above. While only one embodiment has been presented and described, it is to be understood that the invention may be modified without deviating from the spirit of this invention. Accordingly, for an appreciation of the scope and breadth of the invention, reference should be made to the following claims.

What is claimed is:

1. A racing sulky, comprising:
    an arch including a transverse member having a non-circular cross-section and a pair of struts;
    a pair of rails adjacent said arch;
    said struts extending downwardly and forwardly from said transverse member, wherein said transverse member has a major axis, said major axis remaining substantially parallel to a ground plane throughout an operation of said sulky; and
    a wheel rotatably supported on each of said struts.

2. A racing sulky, comprising:
    an arch including a transverse member and a pair of struts wherein said transverse member has an airfoil-shaped cross-section, said struts extending downwardly and forwardly from said transverse member, wherein said transverse member has a major axis, said major axis being oriented substantially parallel to a ground plane;
    a pair of rails adjacent said arch; and
    a wheel rotatably supported on each of said struts.

3. The racing sulky of claim 1, further comprising:
    a seat adjacent said arch; and
    a support member in supporting relation to said seat, wherein said support member is located behind the transverse member and attached thereto.

4. The racing sulky of claim 3, further comprising a band of material extending from said support member adjacent said arch, wherein said support member is attached to said arch by said band.

5. The racing sulky of claim 4, wherein said band substantially encircles said arch and is bonded thereto.

6. The racing sulky of claim 5, wherein said band is bonded by stitch welds.

7. The racing sulky of claim 1, further comprising a seat adjacent said arch, said seat supported on a support member attached to a perimeter said arch, wherein said support member is attached to said arch by a band of material contacting a majority of said perimeter.

8. The racing sulky of claim 7, wherein said band wraps substantially around said perimeter.

9. The racing sulking of claim 7, wherein said band is welded to said arch.

10. The racing sulking of claim 9, wherein said band is stitch welded.

11. The racing sulky of claim 7, wherein said support member is located behind said arch, and said band extends forwardly and upwardly from said support members substantially conforming to at least a portion of the perimeter of said arch.

* * * * *